L. Wilson.
Pipe-Coupling.
N° 73422           Patented Jan. 14, 1868.
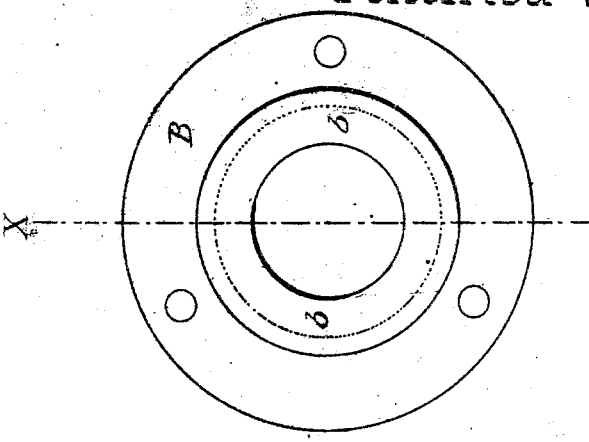
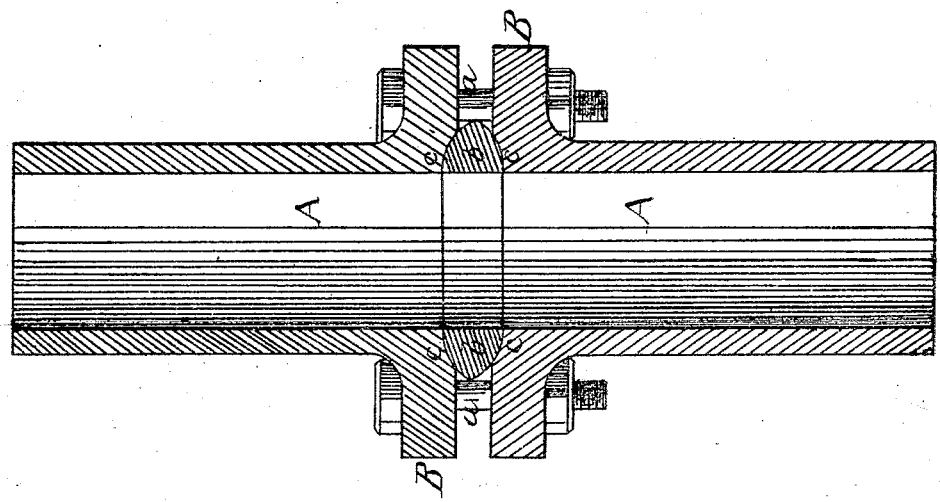
Witnesses:
Inventor:
Louis Wilson
by his agents
Mason, Fenwick & Lawrence

United States Patent Office.

LEWIS WILSON, OF OVID, NEW YORK.

Letters Patent No. 73,422, dated January 14, 1868.

---

IMPROVED PIPE-COUPLING.

---

The Schedule referred to in these Letters Patent and making part of the same.

---

TO ALL WHOM IT MAY CONCERN:

Be it known that I, LEWIS WILSON, of Ovid, in the county of Seneca, and State of New York, have invented a new and improved Steam, Gas, and Water-Pipe Joint; and I do hereby declare that the following is a full, clear, and exact description thereof, reference being had to the accompanying drawings, making a part of this specification, in which—

Figure 1 is a diametrical section through the ends of two sections of a steam, gas, or water-pipe, connected together by my improved joint-ring.

Figure 2 is an end view of one section of pipe, and one of the joint-rings lying in place.

Similar letters of reference indicate corresponding parts in the two figures.

This invention relates to a new and useful improvement in steam, gas, and water-pipe connections or joints, whereby perfectly tight joints can be made between the ends of sections of pipe with very little expense and labor, and when made, the joints will be kept tight without further attention, as long as the pipes themselves remain serviceable.

The nature of my invention consists in a metallic ring, having a sectional form resembling a flattened hollow sphere, fitted to seats, of a form corresponding to its respective surfaces, such seats being formed in the ends of the pieces of pipe which are to be joined together, my invention being such that the joint may be formed and made tight whether the pieces of pipe are placed in a straight line with one another, or are placed so as to form an angle with each other.

To enable others skilled in the art to understand my invention, I will describe its construction and operation.

In the accompanying drawings, A A represent two sections of pipe, which are provided with flanges, B B, on their ends, through which bolts $a$ $a$ are passed, for securing the sections together. The pipes may be made of wrought or cast metal, in the usual manner of constructing them. By means of a tool having a rounded convex cutting-point, concave depressions, $c$ $c$, are formed in the ends of the pipes, which depressions are adapted for receiving and fitting the corresponding convex surfaces of a ring, $b$, through which is a hole equal in diameter to the bore of the pipe, as shown in fig. 1. The ring $b$ may be made of any suitable metal, and in order to have it fit perfectly into its recesses, $c$ $c$, in the pipes, this ring should be properly ground into said recesses. By having the ring $b$ constructed with double convex surfaces, rounded as shown, a perfectly tight joint may be made at the ends of two pipes, whether such pipes be held in a straight line or not. By having the double convex packing-rings made as stated, they can be readily applied to pipes which may have been in use, by making the depressions $c$ in the ends of such pipes, as above described.

I am aware that pipes have been connected together by means of what are denominated ball-joints, wherein half balls formed on the ends of sections of pipes were fitted into corresponding recesses formed in the ends of other sections of pipe. I do not, therefore, lay claim to such mode of making tight joints.

I also am aware that a rubber packing-ring, of a form, in section, corresponding to a wedge or the letter V, has been devised, such ring being made to pack the joint of the pipe by the internal pressure of the steam or other fluid. I, of course, do not claim any such mode of packing joints.

Having described my invention, what I claim as new, and desire to secure by Letters Patent, is—

The double convex metal ring $b$, interposed between the ends of pipes A A, and fitted into recesses $c$ $c$, formed therein, and retained in position by external pressure, applied through screw-bolts $a$ $a$ or their equivalents, substantially in the manner and for the purpose described.

LEWIS WILSON.

Witnesses:
JAMES FOSTER,
CHAS. D. HOYT.